United States Patent
Liu et al.

(10) Patent No.: US 10,580,182 B2
(45) Date of Patent: Mar. 3, 2020

(54) FACIAL FEATURE ADDING METHOD, FACIAL FEATURE ADDING APPARATUS, AND FACIAL FEATURE ADDING DEVICE

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Yu Liu, Beijing (CN); Erjin Zhou, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 17 days.

(21) Appl. No.: 15/814,076

(22) Filed: Nov. 15, 2017

(65) Prior Publication Data
US 2018/0137665 A1 May 17, 2018

(30) Foreign Application Priority Data
Nov. 16, 2016 (CN) .......................... 2016 1 1008892

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00268* (2013.01); *G06K 9/66* (2013.01); *G06T 3/20* (2013.01); *G06T 2207/30201* (2013.01)

(58) Field of Classification Search
CPC ....... H04N 5/2628; G06T 11/60; G06T 11/00; G06T 2207/20132; G06T 2207/30201;
(Continued)

(56) References Cited

U.S. PATENT DOCUMENTS

| 7,227,976 B1 * | 6/2007 | Jung | .................. G06K 9/00228 345/419 |
| 9,430,697 B1 | 8/2016 | Iliadis et al. | |

(Continued)

FOREIGN PATENT DOCUMENTS

| CN | 102034097 | 4/2011 |
| CN | 1807804 | 5/2011 |

(Continued)

OTHER PUBLICATIONS

First Chinese Office Action, issued in the corresponding Chinese patent application No. 201611008893.X, dated Jul. 25, 2019, 18 pages.

(Continued)

*Primary Examiner* — Jingge Wu
(74) *Attorney, Agent, or Firm* — Hamre, Schumann, Mueller & Larson, P.C.

(57) ABSTRACT

Provided is a facial feature adding method, a facial feature adding apparatus, and a facial feature adding device. The facial feature adding method comprises: generating an image to be superimposed based on a given facial image and a feature to be added on the given facial image; and superimposing the image to be superimposed and the given facial image to generate a synthesized facial image. In addition, the facial feature adding method further comprises: generating a first face satisfaction score and a second face satisfaction score by use of a deep convolutional network for face determination and based on the synthesized facial image and a real image with the feature to be added;

(Continued)

calculating an L1 norm of the image to be superimposed; and updating parameters of networks based on the first face satisfaction score, the second face satisfaction score, and the L1 norm.

17 Claims, 10 Drawing Sheets

(51) Int. Cl.
  *G06K 9/66* (2006.01)
  *G06T 3/20* (2006.01)
(58) Field of Classification Search
  CPC .. G06T 3/20; G06K 9/00221; G06K 9/00255; G06K 9/00268; G06K 9/66; G06K 9/00275
  See application file for complete search history.

(56) References Cited

U.S. PATENT DOCUMENTS

| | | | |
|---|---|---|---|
| 2006/0061598 A1* | 3/2006 | Mino | G06K 9/00228 345/629 |
| 2006/0062435 A1* | 3/2006 | Yonaha | G06T 11/60 382/118 |
| 2009/0052747 A1* | 2/2009 | Kamiyama | G06K 9/00281 382/118 |
| 2009/0225099 A1* | 9/2009 | Yuasa | G06K 9/00228 345/629 |
| 2009/0290800 A1 | 11/2009 | Lo | |
| 2010/0088259 A1 | 4/2010 | Valpola et al. | |
| 2011/0081089 A1 | 4/2011 | Mori et al. | |
| 2011/0304607 A1* | 12/2011 | Ito | G06T 11/60 345/419 |
| 2012/0120273 A1* | 5/2012 | Amagai | H04N 5/23203 348/222.1 |
| 2012/0045095 A1 | 12/2012 | Tate et al. | |
| 2013/0328918 A1* | 12/2013 | Okamura | G06T 3/0093 345/625 |
| 2014/0229476 A1 | 8/2014 | Fouad et al. | |
| 2014/0247374 A1* | 9/2014 | Murakami | H04N 5/23219 348/222.1 |
| 2014/0328547 A1* | 11/2014 | Whitehill | G06K 9/00 382/248 |
| 2015/0254501 A1* | 9/2015 | Yamanashi | G06K 9/00268 348/78 |
| 2015/0309569 A1* | 10/2015 | Kohlhoff | G06F 3/013 345/156 |
| 2015/0347820 A1 | 12/2015 | Yin et al. | |
| 2016/0143421 A1* | 5/2016 | Yamanashi | A45D 44/005 434/377 |
| 2016/0148080 A1 | 5/2016 | Yoo et al. | |
| 2016/0171346 A1 | 6/2016 | Han et al. | |
| 2016/0275341 A1 | 9/2016 | Li et al. | |
| 2016/0371537 A1 | 12/2016 | He | |
| 2017/0083755 A1 | 3/2017 | Tang et al. | |
| 2017/0185870 A1 | 6/2017 | Romanenko et al. | |
| 2017/0187987 A1* | 6/2017 | Mukai | H04N 5/225 |
| 2017/0232334 A1* | 8/2017 | Tokunaga | A63F 13/655 463/31 |
| 2017/0236001 A1* | 8/2017 | McLean | G06K 9/00281 345/620 |
| 2017/0262695 A1 | 9/2017 | Ahmed | |
| 2017/0330056 A1 | 11/2017 | Merhav et al. | |
| 2018/0004478 A1* | 1/2018 | Chen | G06F 3/1454 |
| 2018/0032796 A1 | 2/2018 | Kuharenko et al. | |
| 2018/0060649 A1 | 3/2018 | Kastaniotis et al. | |
| 2018/0075317 A1 | 3/2018 | Gomez Suarez et al. | |
| 2018/0089534 A1 | 3/2018 | Ye | |
| 2018/0096457 A1 | 4/2018 | Savides et al. | |
| 2018/0114056 A1 | 4/2018 | Wang et al. | |
| 2018/0182144 A1* | 6/2018 | Imoto | H04N 7/147 |
| 2018/0204051 A1 | 7/2018 | Li et al. | |
| 2018/2004111 | 7/2018 | Zadeh et al. | |
| 2019/0042895 A1 | 2/2019 | Liang et al. | |
| 2019/0156522 A1* | 5/2019 | Sugaya | G06T 11/001 |
| 2019/0171868 A1 | 6/2019 | Taigman et al. | |
| 2019/0286884 A1 | 9/2019 | Rhee et al. | |
| 2019/0294868 A1 | 9/2019 | Martinez | |

FOREIGN PATENT DOCUMENTS

| | | | | |
|---|---|---|---|---|
| CN | 104361328 | | 2/2015 | |
| CN | 106028136 | | 10/2016 | |
| CN | 106056562 | | 10/2016 | |
| JP | 2012103941 A | * | 5/2012 | ............... G06T 1/00 |
| KR | 101515928 | | 4/2015 | |

OTHER PUBLICATIONS

First Chinese Office Action, issued in the corresponding Chinese patent application No. 201611008892.5, dated Jul. 15, 2019, 16 pages.

Chen et al., "An End-to-End System for Unconstrained Face Verification with Deep Convolutional Neural Networks", 2015 IEEE International Conference on Computer Vision Workshop (ICCVW), 2015, pp. 118-126.

Sun et al., "Deep Learning Face Representation from Predicting 10,000 Classes", The IEEE Conference on Computer Vision and Pattern Recognition (CVPR), 2014, pp. 1891-1898.

* cited by examiner

FACIAL FEATURE ADDING METHOD, FACIAL FEATURE ADDING APPARATUS, AND FACIAL FEATURE ADDING DEVICE

CROSS-REFERENCE

The application claims priority to the Chinese patent application No. 201611008892.5, filed Nov. 16, 2016, the entire disclosure of which is incorporated herein by reference as part of the present application.

TECHNICAL FIELD

The present disclosure relates to the technical field of facial feature adding, and more particularly to a facial feature adding method, a facial feature adding apparatus, and a facial feature adding device.

BACKGROUND

At present, one type of facial feature adding method is generating a three-dimensional model through a plurality of two-dimensional pictures of different angles, and then adding features on the three-dimensional model, such as glasses, bangs, masks and so on, and finally rendering to obtain a new two-dimensional image. Another type of facial feature adding method is adding feature material to a two-dimensional picture by using map annotation to obtain a new two-dimensional image.

However, the method of obtaining a new two-dimensional image based on a three-dimensional model has large timeout and low efficiency, and it needs to use pictures of different angles of the same individual to perform three-dimensional modeling, which usually cannot be satisfied in practice. On the other hand, the two-dimensional map method is simple, but there are significant differences between the resulting image and the real picture.

Therefore, new facial feature adding method and apparatus are needed.

SUMMARY

In view of the above problem, the present disclosure is provided.

According to an aspect of the present disclosure, there is provided a facial feature adding method, comprising: generating an image to be superimposed based on a given facial image and a feature to be added on the given facial image; and superimposing the image to be superimposed and the given facial image to generate a synthesized facial image.

According to an embodiment of the present disclosure, the facial feature adding method further comprises: generating a first face satisfaction score by use of a deep convolutional network for face determination and based on the synthesized facial image; calculating an L1 norm of the image to be superimposed; and updating parameters of the facial feature image extraction network and the synthesized feature image generation network based on the first face satisfaction score and the L1 norm of the image to be superimposed.

According to an embodiment of the present disclosure, the facial feature adding method further comprises: generating a second face satisfaction score by use of a deep convolutional network for face determination and based on a real image with the feature to be added; and updating parameters of the deep convolutional network for face determination based on the first face satisfaction score and the second face satisfaction score.

According to another aspect of the present disclosure, there is provided a facial feature adding apparatus, comprising: a to-be-superimposed image generating module configured to generate an image to be superimposed based on a given facial image and a feature to be added on the given facial image; and a synthesized facial image generating module configured to superimpose the image to be superimposed and the given facial image to generate a synthesized facial image.

According to an embodiment of the present disclosure, the facial feature adding apparatus further comprises: a face determining module configured to generate a first face satisfaction score by use of a deep convolutional network for face determination and based on the synthesized facial image; a norm calculating module configured to calculate an L1 norm of the image to be superimposed; and a first parameter adjusting module configured to update parameters of the facial feature image extraction network and the synthesized feature image generation network based on the first face satisfaction score and the L1 norm of the image to be superimposed.

According to an embodiment of the present disclosure, the face determining module is further configured to generate a second face satisfaction score based on a real image with the feature to be added and by use of a deep convolutional network for face determination; and the facial feature adding apparatus further comprises a second parameter adjusting module configured to update parameters of the deep convolutional network for face determination based on the first face satisfaction score and the second face satisfaction score.

According to yet another embodiment of the present disclosure, there is provided a facial feature adding device, comprising: one or more processors; one or more memories in which program instructions are stored, the program instructions being executed by the one or more processors to execute the steps of: generating an image to be superimposed based on a given facial image and a feature to be added on the given facial image; and superimposing the image to be superimposed and the given facial image to generate a synthesized facial image.

With the facial feature adding method and the facial feature adding apparatus according to the embodiment of the present disclosure, by means of generating an image to be superimposed based on a given facial image and a feature to be added on the given facial image and superimposing the image to be superimposed and the given facial image, a synthesized facial image which contains the feature to be added based on the given facial image is generated. In addition, a first face satisfaction score and a second face satisfaction score are generated by use of a deep convolutional network for face determination and based on the synthesized facial image and the real image with the feature to be added, loss functions of the facial feature image extraction network, the synthesized feature image generation network, and the deep convolution network for face determination may be constructed by calculating an L1 norm of the image to be superimposed, thus the facial feature image extraction network, the synthesized feature image generation network, and the deep convolution network for face determination can be trained in synchronization.

BRIEF DESCRIPTION OF THE DRAWINGS

Through the more detailed description of the embodiments of the present disclosure in combination with the accompanying drawings, the above and other objects, features, and advantages of the present disclosure will become more apparent. The drawings are to provide further understanding for the embodiments of the present disclosure and constitute a portion of the specification, and are intended to illustrate the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Figure 1:
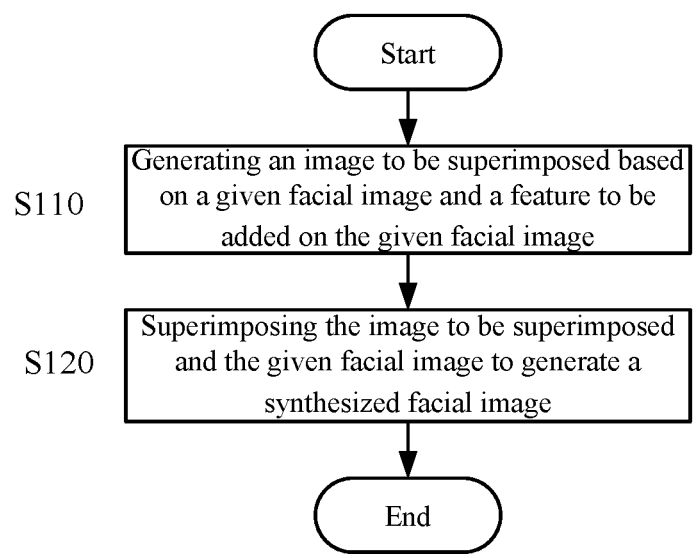
FIG. 1 is a schematic flowchart of a facial feature adding method according to an embodiment of the present disclosure.

FIG. 1 is a schematic flowchart of a facial feature adding method 100 according to an embodiment of the present disclosure.

In step S110, an image to be superimposed is generated based on a given facial image and a feature to be added on the given facial image. The image to be superimposed is an image to be superimposed with the given facial image, and a size of the image to be superimposed may be the same as or different than a size of the given facial image. A channel number of the given facial image is the same as a channel number of the image to be superimposed, for example, both of them are three channels of R, G, B.

In step S120, the image to be superimposed and the given facial image are superimposed to generate a synthesized facial image. A channel number of the synthesized facial image is the same as a channel number of the given facial image, a size of the synthesized facial image is the same as or different than a size of the given facial image.

For example, a size of the image to be superimposed may be the same as a size of the given facial image, a size of the synthesized facial image is the same as a size of the given facial image. In this case, pixels in the image to be superimposed and pixels in the given facial image correspond to each other one by one, and the synthesized facial image can be obtained by directly summing pixel values of corresponding pixels in the image to be superimposed and the given facial image or weighted-summing pixel values of corresponding pixels.

Another example, a size of the image to be superimposed may be smaller than a size of the given facial image, a size of the synthesized facial image is the same as a size of the given facial image. In this case, pixels in a partial image of the given facial image and pixels in the image to be superimposed correspond to each other one by one, and the synthesized facial image can be obtained by directly summing pixel values of corresponding pixels in the image to be superimposed and the partial image of the given facial image or weighted-summing pixel values of corresponding pixels, while keeping pixels in the rest partial image of the given facial image unchanged.

Figure 2:
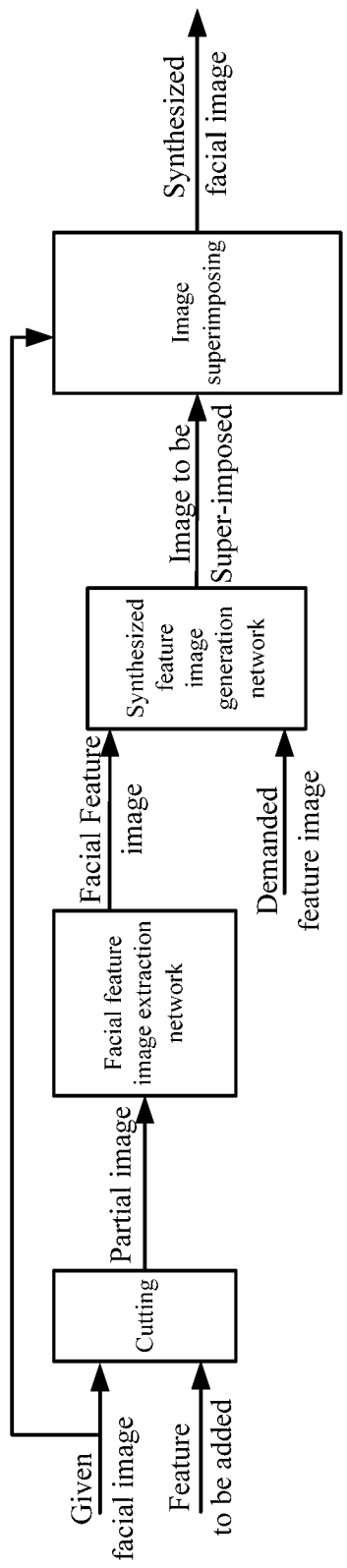
FIG. 2 is a schematic diagram of the principle of generating a synthesized facial image based on a given facial image and a feature to be added according to an embodiment of the present disclosure.

FIG. 2 shows a schematic diagram of the principle of generating a synthesized facial image based on a given facial image and a feature to be added according to an embodiment of the present disclosure.

First, a partial image associated with the feature to be added is cut out from the given facial image based on the feature to be added on the given facial image, a channel number of the partial image is the same as a channel number of the given facial image, a size of the partial image is smaller than or equal to a size of the given facial image. The feature to be added includes N features, a value of each feature is a real number in a range of (−1, 1) or a real number in a range of (0, 1), N is an integer larger than or equal to one. For example, a feature to be added may include, but not limited to, whether glasses were worn, whether there are bangs, light intensity, face rotation angle and so on.

Next, facial feature images are extracted by use of a facial feature image extraction network and based on the partial image that has been cut out, a size of the facial feature images is smaller than a size of the partial image, and a channel number of the facial feature images is larger than a channel number of the partial image. For example, the facial feature images may be M channels of small images whose size is 4×4 or 8×8.

Thereafter, the image to be superimposed is generated by use of the synthesized feature image generation network and based on the facial feature images and demanded feature image(s) corresponding to the feature(s) to be added, a size of the demanded feature image(s) is the same as a size of the facial feature images, a channel number of the image to be superimposed is the same as a channel number of the given facial image. For example, in the case where the features to be added includes N features, the demanded feature image(s) includes N channels, and the N channels of demanded feature image(s) and the N features to be added correspond to each other one by one. For example, a value of a certain feature in the N features to be added is a, then a value of each pixel in the corresponding demanded feature image is a, and a size of the demanded feature image(s) is the same as a size of the facial feature images.

Last, the image to be superimposed and the given facial image are superimposed to generate a synthesized facial image, a channel number of the synthesized facial image is the same as a channel number of the given facial image, a size of the synthesized facial image is the same as or different than a size of the given facial image.

Optionally, linear transformation may be performed on the partial image that has been cut out to convert the partial image into an intermediate image with a first predetermined size, a channel number of the intermediate image is the same as a channel number of the partial image. For example, the first predetermined size may be 128×128 or 256×256, the channel number of the intermediate image may be three, for example, three channels of R, G, and B. In this case, facial feature images with a second predetermined size is extracted by use of a facial feature image extraction network and based on the intermediate image with the first predetermined size, the second predetermined size is smaller than the first predetermined size, and a channel number of the facial feature images is larger than a channel number of the intermediate image. For example, the second predetermined size may be 4×4 or 8×8, the channel number of the facial feature images may be 128 and so on.

Correspondingly, a synthesized feature image with a third predetermined size is generated by use of the synthesized feature image generation network, a channel number of the synthesized facial image is the same as a channel number of the given facial image, the third predetermined size is larger than the second predetermined size, and the third predetermined size may be the same as or different than the first predetermined size. Optionally, inverse linear transformation corresponding to the linear transformation that has been performed after the cutting may be performed on the synthesized feature image with the third predetermined size to generate a partial image to be superimposed, a channel number of the partial image to be superimposed is the same as a channel number of the synthesized feature image, and a size of the partial image to be superimposed is the same as a size of the partial image that has been cut out. Further, optionally, a padding operation corresponding to the cutting operation may be performed on the partial image to be superimposed so as to generate the image to be superimposed, a size of the image to be superimposed is the same as a size of the given facial image.

Figure 3:
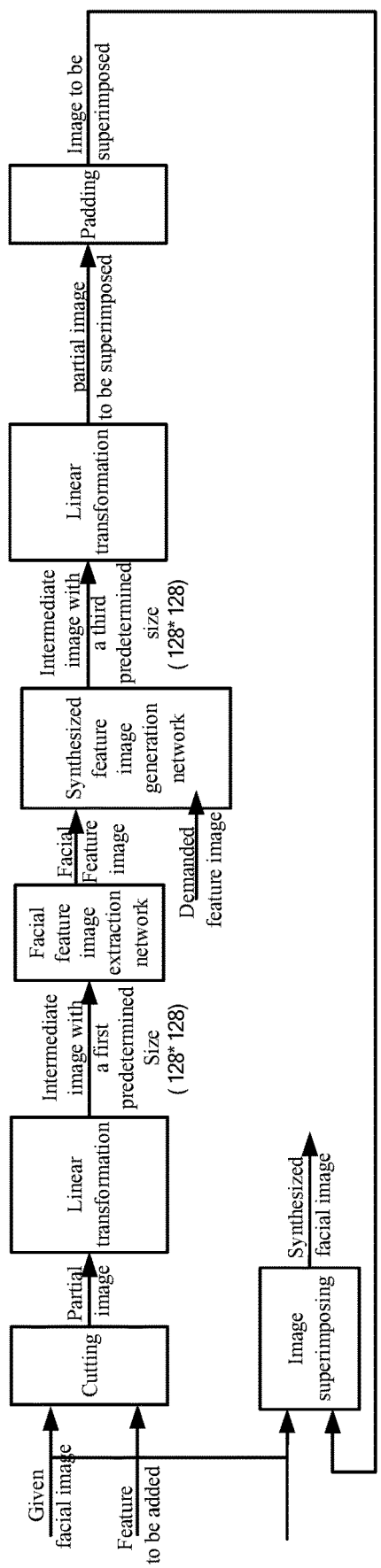
FIG. 3 is another schematic diagram of the principle of generating a synthesized facial image based on a given facial image and a feature to be added according to an embodiment of the present disclosure.

FIG. 3 shows a schematic diagram of the principle of a facial feature adding method comprising the cutting operation, the linear transformation, and the padding operation described above according to an embodiment of the present disclosure.

According to an embodiment of the present disclosure, linear transformation may be performed on the synthesized feature image with the third predetermined size to generate a partial image to be superimposed, a size of the partial image to be superimposed is the same as a size of the partial image that has been cut out, and a channel number of the partial image to be superimposed is the same as a channel number of the given facial image, and any channel of the partial image to be superimposed uniquely corresponds to one channel of the given facial image.

Optionally, the partial image to be superimposed may be used as the image to be superimposed. In the case, it is possible to, corresponding to the cutting performed on the given facial image, superimpose, pixel by pixel, corresponding channels of the image to be superimposed and the given facial image at a cutting position, or weighted-superimpose, pixel by pixel, corresponding channels of the image to be superimposed and the given facial image at a cutting position, so as to generate the synthesized facial image, a channel number of the synthesized facial image is the same as a channel number of the given facial image.

Optionally, according to an embodiment of the present disclosure, further, it is possible to, corresponding to the cutting performed on the given facial image, perform image padding on the partial image to be superimposed so as to generate the image to be superimposed, a size of the image to be superimposed is the same as a size of the given facial image, a channel number of the image to be superimposed is the same as a channel number of the given facial image, and any channel of the image to be superimposed uniquely corresponds to one channel of the given facial image. In addition, it is possible to superimpose, pixel by pixel, corresponding channels of the image to be superimposed and the given facial image, or weighted-superimpose, pixel by pixel, corresponding channels of the image to be superimposed and the given facial image, so as to generate the synthesized facial image, a channel number of the synthesized facial image is the same as a channel number of the given facial image.

Figure 4:
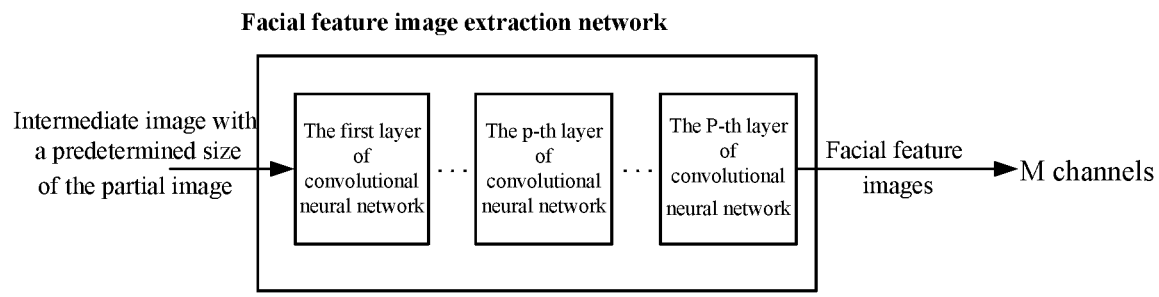
FIG. 4 is a schematic diagram of structure of a facial feature extraction network according to an embodiment of the present disclosure.

FIG. 4 shows a schematic diagram of structure of a facial feature extraction network according to an embodiment of the present disclosure.

As shown in FIG. 4, the facial feature image extraction network according to the embodiment of the present disclosure comprises P layers of convolutional neural network in concatenation, P being an integer larger than or equal to two. A size of output images of a p-th layer of convolutional neural network is smaller than a size of input images thereof, and a channel number of the output images of the p-th layer of convolutional neural network is larger than a channel number of the input images thereof, p being an integer larger than or equal to one and smaller than or equal to P.

For example, corresponding to FIG. 2, a first layer of the P layers of convolutional neural network is used to receive the partial image, the partial image for example is three (channels) of images with a size of 128×128, for example, images with a size of 128×128 in R channel, G channel, and B channel, a channel number of the intermediate images outputted from the first layer of convolutional neural network is larger than a channel number of the partial image, and a size of the intermediate images outputted from the first layer of convolutional neural network is smaller than a size of the partial image, a P-th layer of convolutional neural network outputs a plurality of small images, for example, 128 small images whose size is 4×4 or 8×8.

For example, corresponding to FIG. 3, a first layer of convolutional neural network is used to receive an intermediate image with the first predetermined size, a P-th layer of convolutional neural network is used to output the facial feature images with the second predetermined size. For example, the first predetermined size is 128×128 or 256× 256, the second predetermined size is 4×4 or 8×8, a channel number of the facial feature images is 128 and so on.

Figure 5A:
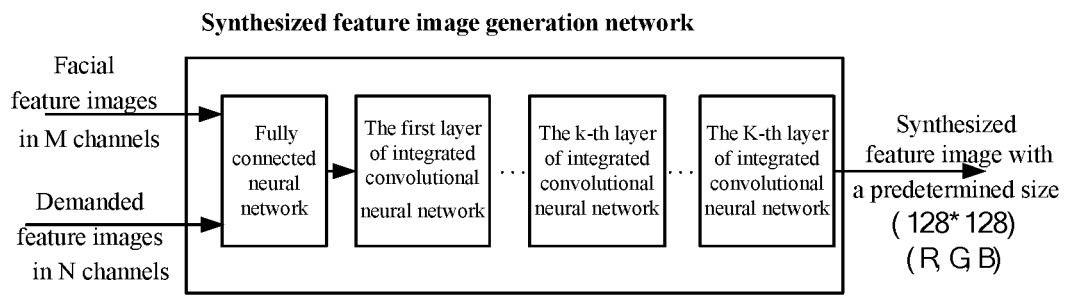
FIG. 5A is a schematic diagram of structure of a synthesized feature image generation network according to an embodiment of the present disclosure.
Figure 5B:
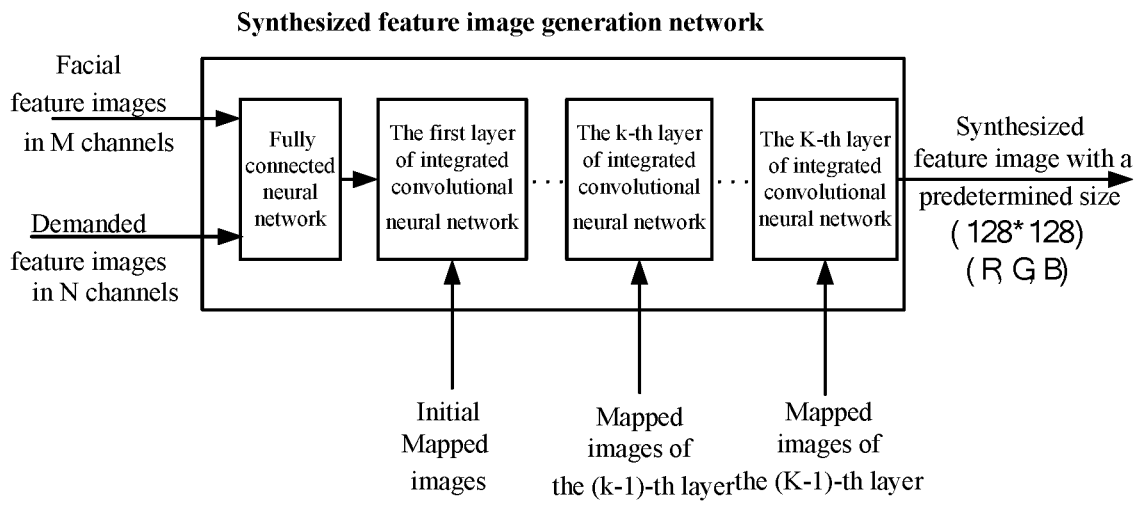
FIG. 5B is another schematic diagram of structure of a synthesized feature image generation network according to an embodiment of the present disclosure.

FIGS. 5A and 5B show a schematic diagram of structure of the synthesized feature image generation network according to an embodiment of the present disclosure.

As shown in FIGS. 5A and 5B, the synthesized feature image generation network according to the embodiment of the present disclosure comprises at least one layer of fully connected neural network and K layers of integrated convolutional neural network in concatenation, K being an integer larger than or equal to two. The number of layers K of integrated convolutional neural network is determined by a size of the synthesized feature image, the higher the size of the synthesized feature image is, the higher the number of layers K of integrated convolutional neural network is. For example, the size of the synthesized feature image is 256× 256, the required number of layers of integrated convolutional neural network is 3 layers; the size of the synthesized feature image is 128×128, the required number of layers of integrated convolutional neural network is 2 layers.

As shown in FIG. 5A, the at least one layer of fully connected neural network is used to receive the facial feature images in M channels and the demanded feature image(s) in N channels, a size of the facial feature images is the same as a size of the demanded feature image(s), the at least one layer of fully connected neural network generates initial synthesized images based on the facial feature images in M channels and the demanded feature image(s) in N channels. Thereafter, a first layer of integrated convolutional neural network receives the initial synthesized images outputted from the at least one layer of fully connected neural network and generates synthesized images of the first layer; a k-th layer of integrated convolutional neural network receives synthesized images of a (k−1)-th layer outputted from the (k−1)-th layer of integrated convolutional neural network and generates synthesized images of the k-th layer, k being an integer larger than or equal to two and smaller than or equal to K, a size of the synthesized images of the k-th layer is larger than a size of the synthesized images of the (k−1)-th layer, and a channel number of the synthesized images of the k-th layer is smaller than a channel number of the synthesized images of the (k−1)-th layer; last, a K-th layer of integrated convolutional neural network is used to receive synthesized images of a (K−1)-th layer as outputted from the (K−1)-th layer of integrated convolutional neural network, and generate a synthesized image of the K-th layer, the synthesized image of the K-th layer is taken as the synthesized feature image with the third predetermined size.

As shown in FIG. 5B, the at least one layer of fully connected neural network receives the facial feature images in M channels and the demanded feature image(s) in N channels, a size of the facial feature images is the same as a size of the demanded feature image(s), the at least one layer of fully connected neural network generates initial synthesized images based on the facial feature images in M channels and the demanded feature image(s) in N channels. Thereafter, a first layer of integrated convolutional neural network not only can receive the initial synthesized images from the at least one layer of fully connected neural network, but also can receive initial mapped images in N channels, and generate synthesized images of the first layer based on the initial synthesized images and the initial mapped image, wherein the initial mapped image in N channels and the N features to be added correspond to each other one by one. For example, a value of a certain feature of the N features to be added is a, then a value of each pixel of the corresponding initial mapped image is a, and a size of the initial mapped images is the same as the initial synthesized images. Hereinafter, for the sake of simplification and uniformity, the initial synthesized images are referred to as the synthesized images of the zero layer and the initial mapped images are referred to as the mapped images of the zero layer. Likewise, a k-th layer of integrated convolutional neural network not only can receive synthesized images of a (k−1)-th layer outputted from the (k−1)-th layer of integrated convolutional neural network, but also can receive mapped images of the (k−1)-th layer in N channels, and generate synthesized images of the k-th layer based on the synthesized images of the (k−1)-th layer and the mapped images of the (k−1)-th layer, wherein the mapped images in N channels of the (k−1)-th layer and the N features to be added correspond to each other one by one, a size of the mapped images of the (k−1)-th layer is the same as a size of the synthesized images of the (k−1)-th layer, a size of the synthesized images of the k-th layer is larger than a size of the synthesized images of the (k−1)-th layer, and a channel number of the synthesized images of the k-th layer is smaller than a channel number of the synthesized images of the (k−1)-th layer; last, a K-th layer of integrated convolutional neural network receives synthesized images of a (K−1)-th layer as outputted from the (K−1)-th layer of integrated convolutional neural network, and also receives mapped images of the (K−1)-th layer of N channels, and generates the synthesized image of the K-th layer based on the synthesized images of the (K−1)-th layer and the mapped images of the (K−1)-th layer in N channels, wherein the mapped images in N channels of the (K−1)-th layer and the N features to be added correspond to each other one by one, a size of the synthesized image of the (K−1)-th layer is the same as a size of the mapped image of the (K−1)-th layer, a size of the synthesized image of the K-th layer is larger than a size of the synthesized images of the (K−1)-th layer, and a channel number of the synthesized image of the K-th layer is smaller than a channel number of the synthesized images of the (K−1)-th layer.

As will be appreciated, any layer (the k-th layer, k being an integer larger than or equal to one and smaller than or equal to K) of integrated convolutional neural network in the K layers of integrated convolutional neural network can generate the synthesized image(s) of this layer based on the synthesized images received by it, or generate the synthesized image(s) of this layer based on the synthesized images of the (k−1)-th layer and the mapped images of the (k−1)-th received by it. In addition, it should be understood that, the mapped images of the (k−1)-th layer comprise N channels of mapped images of the (k−1)-th layer, the mapped images of the (k−1)-th layer in N channels corresponds to N features to be added one by one.

Figure 6A:
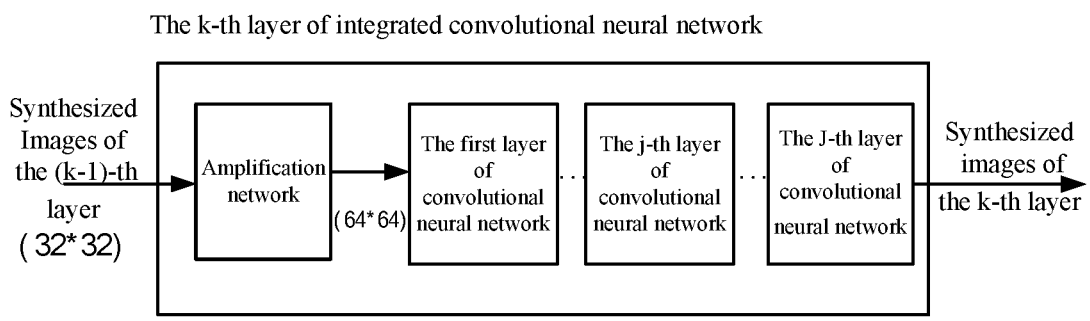
FIG. 6A is a schematic diagram of structure of an integrated convolutional neural network corresponding to FIG. 5A according to an embodiment of the present disclosure.

FIG. 6A shows a schematic diagram of structure of an integrated convolutional neural network corresponding to FIG. 5A according to an embodiment of the present disclosure.

As shown in FIG. 6A, each layer of integrated convolutional neural network comprises an amplification network and J layers of convolutional neural networks, J being an integer larger than or equal to two. Hereinafter, for convenience of description, the integrated convolutional neural network shown in FIG. 6A is referred to as the integrated convolutional neural network of the k-th layer.

Corresponding to the deep neural network for facial image generation shown in FIG. 5A, the integrated convolutional neural network of the k-th layer as shown in FIG. 6A receives synthesized images of a (k−1)-th layer, k being an integer larger than or equal to one and smaller than or equal to K.

Specifically, in the case where k equals to one, the amplification network of the first layer of integrated convolutional neural network is used to receive output images (the initial synthesized images, i.e., the synthesized images of the zero layer) as outputted from the fully connected neural network; in the case where k is larger than one, the amplification network of the k-th layer of integrated convolutional neural network is used to receive output images (the synthesized images of the (k−1)-th layer) as outputted from the (k−1)-th layer of integrated convolutional neural network. The amplification network amplifies the received input images (the synthesized images of the (k−1)-th layer) to generate amplified images; thereafter, a first layer of convolutional neural network receives the amplified images and generates intermediate images of the first layer; likewise, a j-th layer of convolutional neural network receives intermediate images of a (j−1)-th layer from the (j−1)-th layer of convolutional neural network and generates intermediate images of the j-th layer, a size of the intermediate images of the j-th layer is the same as a size of the intermediate images of the (j−1)-th layer, a channel number of the intermediate images of the j-th layer may be larger than, equal to, or smaller than a channel number of the intermediate images of the (j−1)-th layer, j being an integer larger than or equal to two and smaller than or equal to J; last, a J-th layer of convolutional neural network receives intermediate images of a (J−1)-th layer and generates intermediate images of the J-th layer, which is taken as synthesized images of the k-th layer outputted by the k-th layer of integrated convolutional neural network.

For example, the amplification network amplifies the received synthesized images of the (k−1)-th layer two times, that is, it is assumed that a size of the synthesized images of the (k−1)-th layer is 32×32, then a size of the amplified images generated by the amplification network is 64×64. It should be understood that, a channel number of the amplified images generated by the amplification network is the same as a channel number the synthesized images of the (k−1)-th layer, and a channel number of the synthesized images of the k-th layer as generated by the k-th layer of integrated convolutional neural network is smaller than a channel number of the synthesized images of the (k−1)-th layer. For example, the channel number of the synthesized images of the k-th layer as generated by the k-th layer of integrated convolutional neural network is usually ½, ⅓ and so on of the channel number of the synthesized image of the (k−1)-th layer.

Figure 6B:
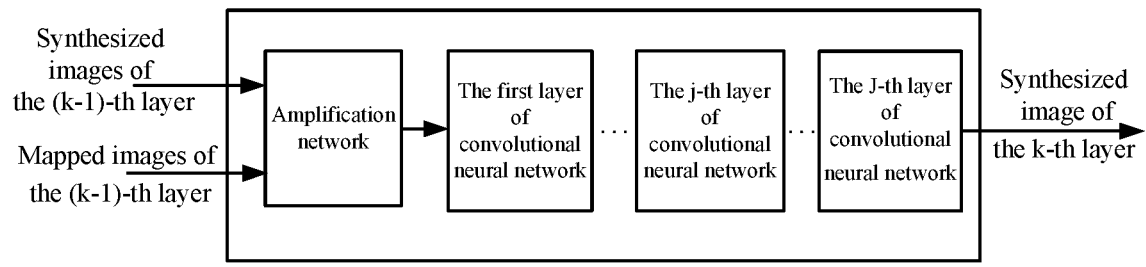
FIG. 6B is a schematic diagram of structure of an integrated convolutional neural network corresponding to FIG. 5B according to an embodiment of the present disclosure.

FIG. 6B shows a schematic diagram of structure of an integrated convolutional neural network corresponding to FIG. 5B according to an embodiment of the present disclosure.

As shown in FIG. 6B, each layer of integrated convolutional neural network comprises an amplification network and J layers of convolutional neural networks, J being an integer larger than or equal to two. Hereinafter, for convenience of description, the integrated convolutional neural network shown in FIG. 6B is referred to as the integrated convolutional neural network of the k-th layer.

Corresponding to the deep neural network for facial image generation shown in FIG. 5B, the integrated convolutional neural network of the k-th layer as shown in FIG. 6B receives synthesized images of a (k−1)-th layer and also mapped images of the (k−1)-th layer, k being an integer larger than or equal to one and smaller than or equal to K.

Specifically, in the case where k equals to one, the amplification network of the first layer of integrated convolutional neural network is used to receive output images (the initial synthesized images, i.e., the synthesized images of the zero layer) as outputted from the fully connected neural network and the initial mapped images (the mapped images of the zero layer); in the case where k is larger than one, the amplification network of the k-th layer of integrated convolutional neural network is used to receive output images (the synthesized images of the (k−1)-th layer) as outputted from the (k−1)-th layer of integrated convolutional network and the mapped images of the (k−1)-the layer. The amplification network receives the synthesized images of the (k−1)-th layer and the mapped images of the (k−1)-th layer, and amplifies the synthesized images of the (k−1)-th layer and the mapped images of the (k−1)-th layer to generate amplified images, thereafter a first layer of convolutional neural network receives the amplified images and generates intermediate images of the first layer; likewise, a j-th layer of convolutional neural network receives intermediate images of a (j−1)-th layer from the (j−1)-th layer of convolutional neural network, a size of the intermediate images of the j-th layer is the same as a size of the intermediate images of the (j−1)-th layer, and a channel number of the intermediate images of the j-th layer may be smaller than, equal to, or larger than a channel number of the intermediate images of the (j−1)-th layer, j being an integer larger than or equal to two and smaller than or equal to J; last, a J-th layer of convolutional neural network receives intermediate images of an (J−1)-th layer and generates intermediate images of a J-th layer, the intermediate images of the J-th layer are taken as the synthesized images of the k-th layer outputted by the k-th layer of integrated convolutional neural network.

Figure 6C:
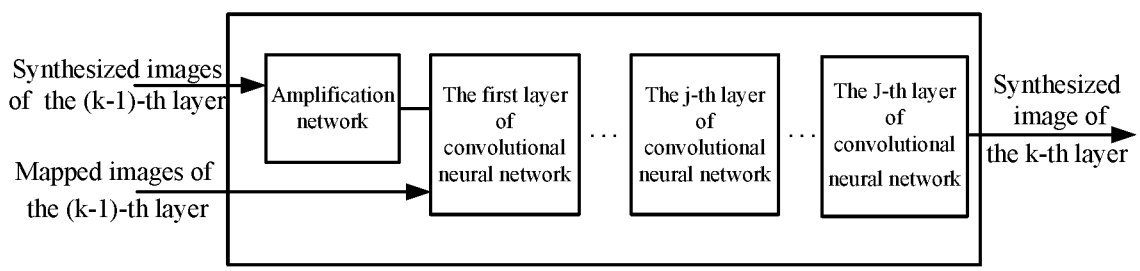
FIG. 6C is another schematic diagram of structure of an integrated convolutional neural network corresponding to FIG. 5B according to an embodiment of the present disclosure.

FIG. 6C is another schematic diagram of structure of an integrated convolutional neural network corresponding to FIG. 5B according to an embodiment of the present disclosure.

Different than inputting the mapped images of the (k−1)-th layer into the amplification network shown in FIG. 6B, the mapped images of the (k−1)-th layer are inputted into the first layer of convolutional neural network in FIG. 6C. In this case, a size of each of the mapped images of the (k−1)-th layer is the same as a size of amplified images outputted by the amplification network. The first layer of convolutional neural network receives the amplified images and the mapped images of the (k−1)-th layer and generates intermediate images of the first layer; likewise, a j-th layer of convolutional neural network receives intermediate images of a (j−1)-th layer and generates intermediate images of the j-th layer, last, an J-th layer of convolutional neural network receives intermediate images of a (J−1)-th layer and generates intermediate images of the J-th layer, the intermediate images of the J-th layer are taken as synthesized images of the k-th layer outputted by the k-th layer of integrated convolutional neural network.

Optionally, besides the first layer of convolutional neural network, the mapped images of the (k−1)-th layer may be also inputted to any layer among the J layers of convolutional neural network. It should be noted that, no matter which mapped images of the (k−1)-th layer are inputted to which layer of convolutional neural network, a size of the mapped images of the (k−1)-th layer inputted to said layer is the same as a size of the intermediate images inputted to said layer.

According to an embodiment of the present disclosure, after the synthesized facial image is generated, the generated synthesized facial image is further evaluated, and, optionally, parameters of the facial feature image extraction network and the synthesized feature image generation network can be updated according to an evaluation result.

Figure 7:
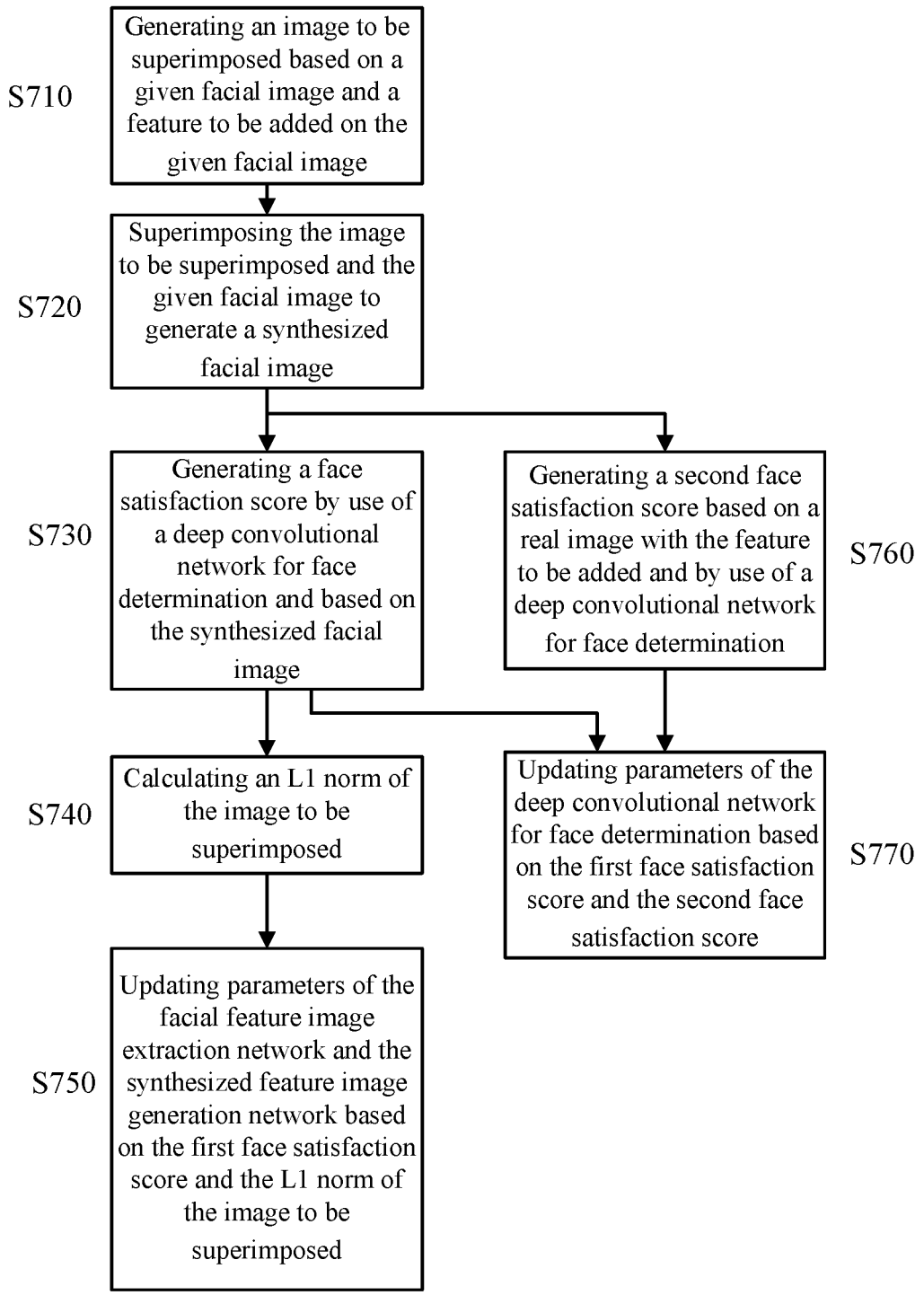
FIG. 7 is a further schematic flowchart of a facial feature adding method according to an embodiment of the present disclosure.

FIG. 7 shows a further schematic flowchart of a facial feature adding method according to an embodiment of the present disclosure;

In step S710, an image to be superimposed is generated based on a given facial image and a feature to be added on the given facial image. Operation in step S710 is similar to operation in step S110, no details are repeated here.

In step S720, the image to be superimposed and the given facial image are superimposed to generate a synthesized facial image. A channel number of the synthesized facial image is the same as a channel number of the given facial image, a size of the synthesized facial image is the same as or different than a size of the given facial image. Operation in step S720 is similar to operation in step S120, no details are repeated here.

Thereafter, in step S730, a face satisfaction score is generated by use of a deep convolutional network for face determination and based on the synthesized facial image. The face satisfaction score is used to represent whether the synthesized facial image is a facial image, and its value is a real number in a range from zero to one.

In step S740, an L1 norm of the image to be superimposed is calculated. For example, the channel number of the image to be superimposed is 3, and for each channel, all pixel values of the image to be superimposed on this channel are summed to obtain the pixel value of the image to be superimposed on this channel, and then the pixel values of the image to be superimposed on the respective channels are further summed, so as to obtain the L1 norm of the image to be superimposed. By using the L1 norm, it is possible to make the number of pixel dots whose value is zero of the generated image to be superimposed as much as possible, so as to ensure that identity information of people in the post-superimposed picture is not changed.

In step S750, parameters of the facial feature image extraction network and the synthesized feature image generation network are updated based on the first face satisfaction score and the L1 norm of the image to be superimposed.

As an example, first, a first combination score may be calculated by use of a first linear combination function and based on the face satisfaction score and the L1 norm of the image to be superimposed. For example, the first linear combination function may be $Sg1=a1*Sf1+b1*L1$, where Sg1 represents the first combination score, Sf1 represents the face satisfaction score, L1 represents the L1 norm of the image to be superimposed, a1 and b1 represent the weighting factors.

Thereafter, parameters of the facial feature image extraction network and the synthesized feature image generation network are updated based on the first combination score. For example, a gradient descent method may be used to update parameters of each network, for example, the reverse conduction rule may be used to calculate a gradient of each parameter.

In addition, the facial feature adding method according to an embodiment of the present disclosure can further evaluate a real image with the feature to be added by use of a deep convolutional network for face determination, thereby parameters of the deep convolutional network for face determination are updated according to an evaluation result.

In step S760, a second face satisfaction score is generated based on a real image with the feature to be added and by use of a deep convolutional network for face determination.

In step S770, parameters of the deep convolutional network for face determination are updated based on the first face satisfaction score and the second face satisfaction score.

As an example, first, a second combination score may be calculated by use of a second linear combination function and based on the first face satisfaction score and the second face satisfaction score. For example, the second linear combination function may be $Sg2=a2*Sf1+b2*Sf2$, where Sg2 represents the second combination score, Sf1 represents the first face satisfaction score, Sf2 represents the second face satisfaction score, a2 and b2 represent the weighting factors. Optionally, $a2=b2=1$.

Thereafter, coefficients of the deep convolutional network for face determination are updated according to the second combination score. As an example, a gradient descent method may be used to update parameters of each network, for example, the reverse conduction rule may be used to calculate a gradient of each parameter.

Figure 8:
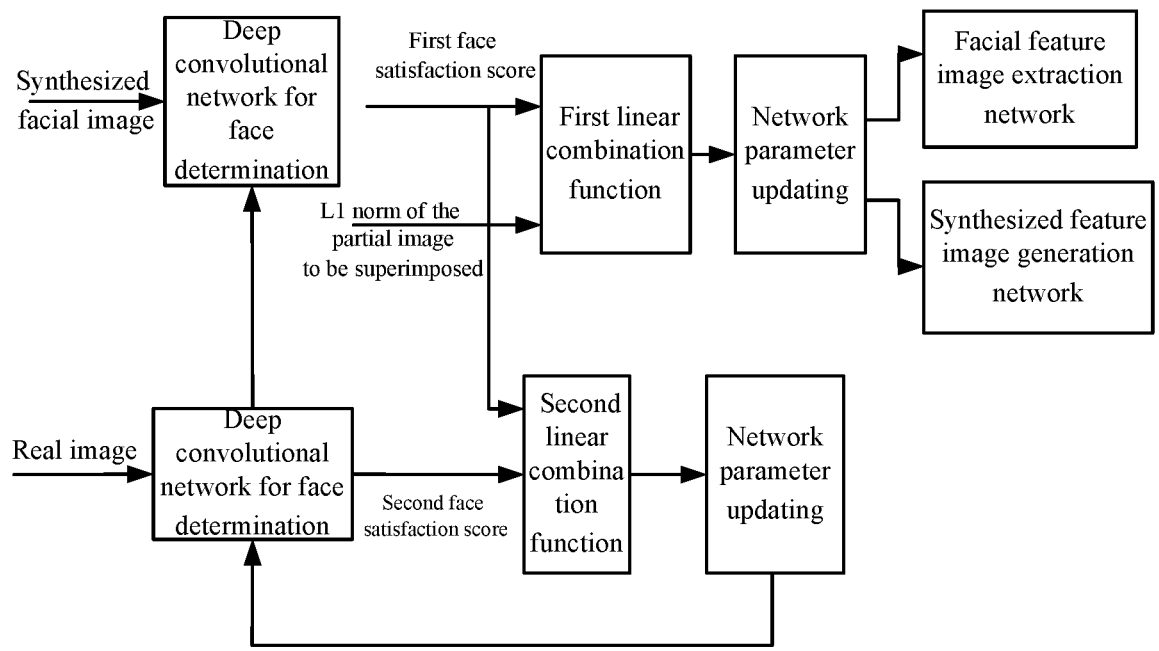
FIG. 8 is a schematic diagram of the principle of a synthesized facial image determination and network training method according to an embodiment of the present disclosure.

FIG. 8 shows a schematic diagram of the principle of a synthesized facial image determination and network training method according to an embodiment of the present disclosure.

Figure 9:
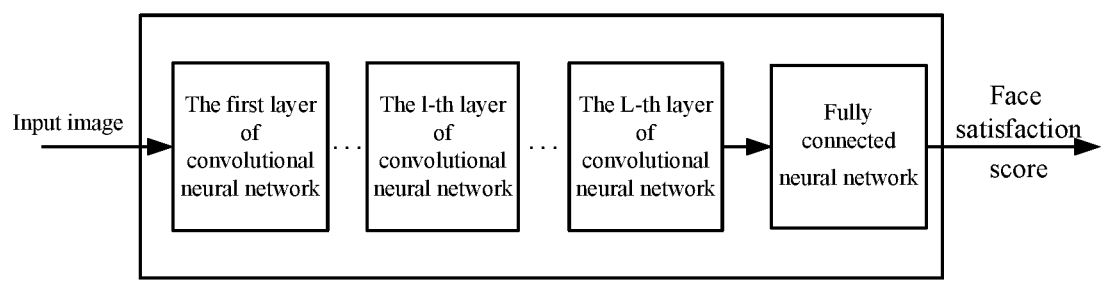
FIG. 9 is a schematic diagram of structure of a deep convolutional network for face determination according to an embodiment of the present disclosure.

FIG. 9 shows a schematic diagram of structure of a deep convolutional network for face determination according to an embodiment of the present disclosure.

As shown in FIG. 9, the deep convolutional network for face determination according to an embodiment of the present disclosure comprises L layers of convolutional neural network and at least one layer of fully connected neural network. A first layer of convolutional neural network is used to receive the input image, the at least one layer of fully connected network receives output images of the L-th layer of convolutional neural network and outputs the face satisfaction score.

Specifically, the first layer of convolutional neural network is used to receive the synthesized facial image, the at least one layer of fully connected neural network is used to receive output images from the L-th layer of convolutional neural network and outputs the first face satisfaction score; the first layer of convolutional neural network is used to receive the real image with the feature to be added, the at least one layer of fully connected neural network is used to receive the output images of the L-th layer of convolutional neural network and outputs the second face satisfaction score.

In addition, in one exemplary implementation of the embodiment of the present disclosure, in the deep convolutional network for facial feature extraction, the synthesized feature image generation network, the integrated convolutional neural network, the deep convolutional network for face determination described above, a non-linear function layer is nested on the last layer of convolutional neural network in each of said networks, and except the last layer of convolutional neural network in each of said networks, a normalized non-linear function layer is nested on each layer of convolutional neural network in each of said networks. Those skilled in the art can implement such non-linear function layer and such normalized non-linear functional layer by using the relevant methods in the prior art, no details are described here, and the present disclosure is not subject to limitations of specific normalization methods and non-linear functions. The embodiment using this exemplary implementation has better technical effect in comparison to other embodiments, i.e. the synthesized face satisfies particular requirements much more.

Figure 10:
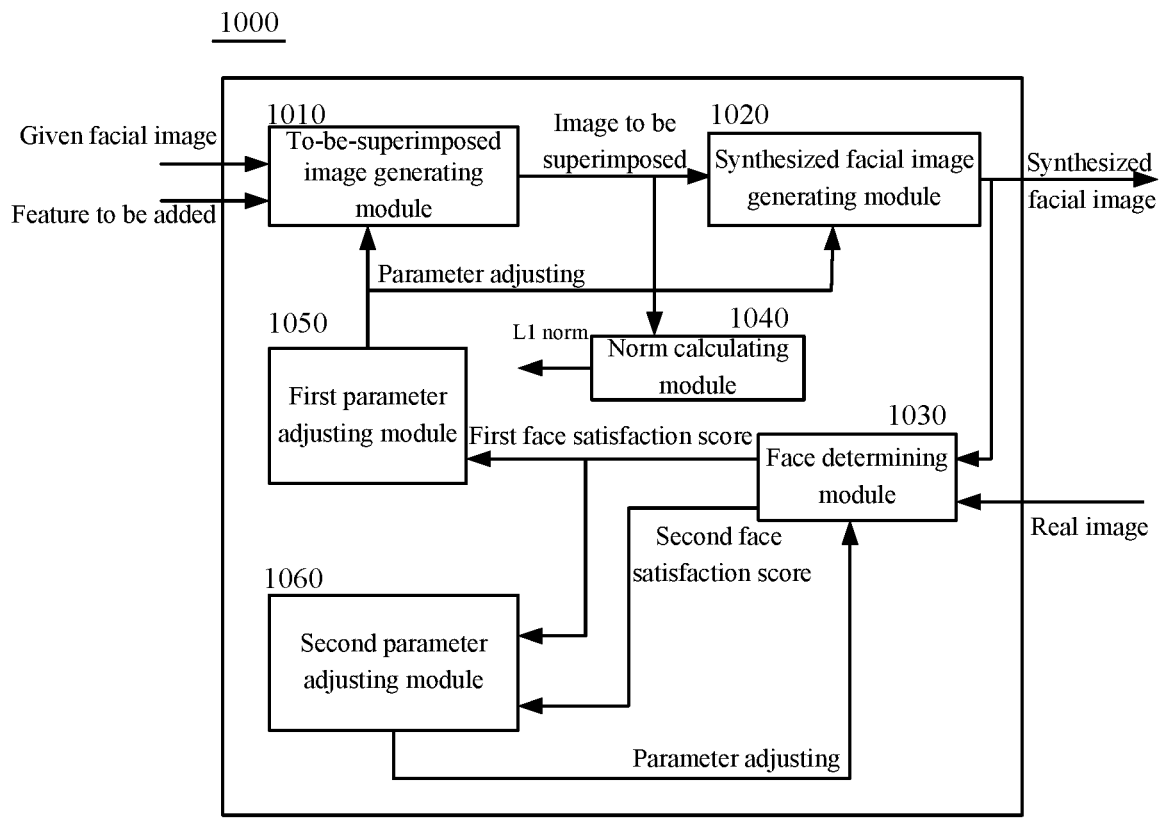
FIG. 10 is a schematic block diagram of a facial feature adding apparatus according to an embodiment of the present disclosure.

FIG. 10 shows a schematic block diagram of a facial feature adding apparatus according to an embodiment of the present disclosure.

As shown in FIG. 10, the facial feature adding apparatus 1000 comprises a to-be-superimposed image generating module 1010, and a synthesized facial image generating module 1020.

The to-be-superimposed image generating module 1010 is configured to generate an image to be superimposed based on a given facial image and a feature to be added on the given facial image.

The synthesized facial image generating module 1020 is configured to superimpose the image to be superimposed and the given facial image to generate a synthesized facial image.

In addition, the facial feature adding apparatus 1000 may further comprise a face determining module 1030, a norm calculating module 1040, a first parameter adjusting module 1050, and a second parameter adjusting module 1060.

The face determining module 1030 is configured to generate a first face satisfaction score by use of a deep convolutional network for face determination and based on the synthesized facial image, and, optionally, generate a second face satisfaction score based on a real image with the feature to be added and by use of a deep convolutional network for face determination.

The norm calculating module 1040 is configured to calculate an L1 norm of the image to be superimposed.

The first parameter adjusting module 1050 is configured to update parameters of the facial feature image extraction network and the synthesized feature image generation network based on the first face satisfaction score and the L1 norm of the image to be superimposed The first parameter adjusting module 1050 may comprise a first combining module and a first parameter updating module. The first combining module is configured to calculate a first combination score by use of a first linear combination function and based on the face satisfaction score and the L1 norm of the image to be superimposed. And the first parameter updating module is configured to update parameters of the facial feature image extraction network and the synthesized feature image generation network based on the first combination score.

The second parameter adjusting module 1060 is configured to update parameters of the deep convolutional network for face determination based on the first face satisfaction score and the second face satisfaction score.

The second parameter adjusting module 1060 may comprise a second combining module and a second parameter updating module. The second combining module is configured to calculate a second combination score by use of a second linear combination function and based on the first face satisfaction score and the second face satisfaction score. And the second parameter updating module is configured to update parameters of the deep convolutional network for face determination based on the second combination score.

Figure 11:
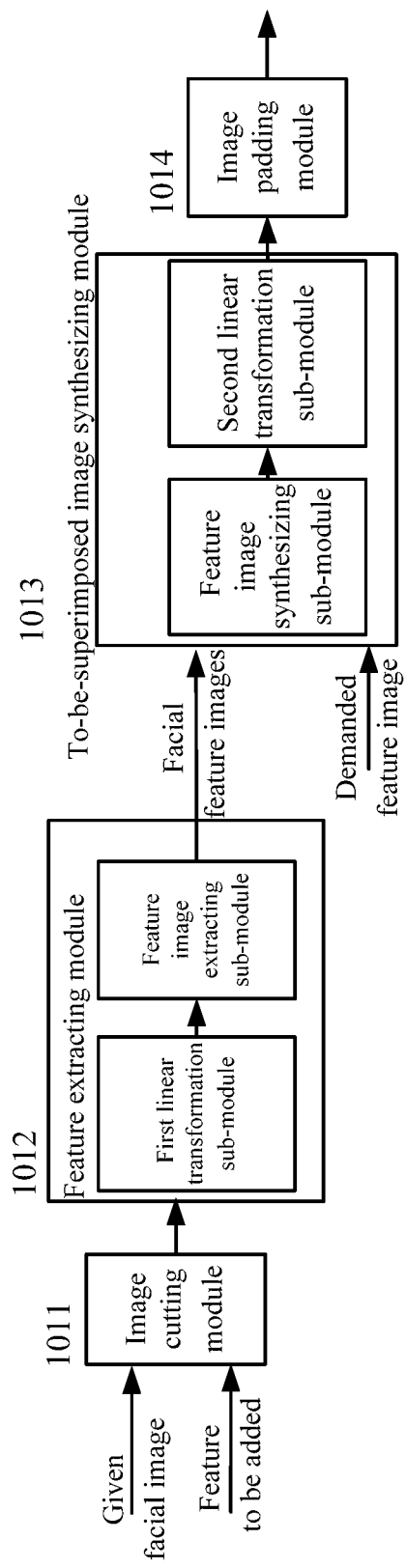
FIG. 11 is a schematic block diagram of a to-be-superimposed image generating module according to an embodiment of the present disclosure.

FIG. 11 shows a schematic block diagram of a to-be-superimposed image generating module according to an embodiment of the present disclosure.

As shown in FIG. 11, the to-be-superimposed image generating module 1010 comprises an image cutting module 1011, a feature extracting module 1012, and a to-be-superimposed image synthesizing module 1013.

The image cutting module 1011 is configured to cut out a partial image associated with the feature to be added from the given facial image based on the feature to be added on the given facial image, a channel number of the partial image being the same as a channel number of the given facial image.

The feature extracting module 1012 is configured to extract facial feature images by use of a facial feature image extraction network and based on the partial image that has been cut out, a size of the facial feature images being smaller than a size of the partial image, and a channel number of the facial feature images being larger than a channel number of the partial image.

The to-be-superimposed image synthesizing module 1013 is configured to generate the image to be superimposed by use of the synthesized feature image generation network and based on the facial feature images and a demanded feature image(s) corresponding to the feature(s) to be added, a channel number of the image to be superimposed being the same as a channel number of the given facial image.

Optionally, the feature extracting module 1012 may comprise a first linear transformation sub-module and a feature image extracting sub-module, and the to-be-superimposed image synthesizing module 1013 may comprise a feature image synthesizing sub-module and a second linear transformation sub-module.

The first linear transformation sub-module is configured to perform linear transformation on the partial image that has been cut out to obtain an intermediate image with a first predetermined size, a channel number of the intermediate image being the same as a channel number of the partial image.

The feature image extracting sub-module is configured to extract facial feature images with a second predetermined size by use of a facial feature image extraction network and based on the intermediate image with the first predetermined size, the second predetermined size being smaller than the first predetermined size, and a channel number of the facial feature images being larger than a channel number of the intermediate image.

The feature image synthesizing sub-module is configured to generate a synthesized feature image with a third predetermined size by use of the synthesized feature image generation network and based on the facial feature images and the demanded feature image(s), the third predetermined size being larger than the second predetermined size, and the third predetermined size being the same as or different than the first predetermined size;

The second linear transformation sub-module is configured to perform linear transformation on the synthesized feature image with the third predetermined size to generate a partial image to be superimposed, a size of the partial image to be superimposed is the same as a size of the partial image that has been cut out, and a channel number of the partial image to be superimposed is the same as a channel number of the given facial image, and any channel of the partial image to be superimposed uniquely corresponds to one channel of the given facial image.

In this case, the partial image to be superimposed serves as the image to be superimposed, corresponding to the cutting performed on the given facial image, corresponding channels of the image to be superimposed and the given facial image are superimposed, pixel by pixel, at a cutting position, or corresponding channels of the image to be superimposed and the given facial image are weighted-superimposed, pixel by pixel, at a cutting position, so as to generate the synthesized facial image, a channel number of the synthesized facial image being the same as a channel number of the given facial image.

In addition, optionally, the to-be-superimposed image generating module 1010 may further comprise an image padding module 1014.

The image padding module 1014 is configured to, correspondingly to the cutting performed on the given facial image, perform image padding on the partial image to be superimposed so as to generate the image to be superimposed. A size of the image to be superimposed is the same as a size of the given facial image, a channel number of the image to be superimposed is the same as a channel number of the given facial image, and any channel of the image to be superimposed uniquely corresponds to one channel of the given facial image.

In this case, the synthesized facial image generating module superimposes, pixel by pixel, corresponding channels of the image to be superimposed and the given facial image, or weighted-superimposes, pixel by pixel, corresponding channels of the image to be superimposed and the given facial image, so as to generate the synthesized facial image, a channel number of the synthesized facial image being the same as a channel number of the given facial image.

Figure 12:
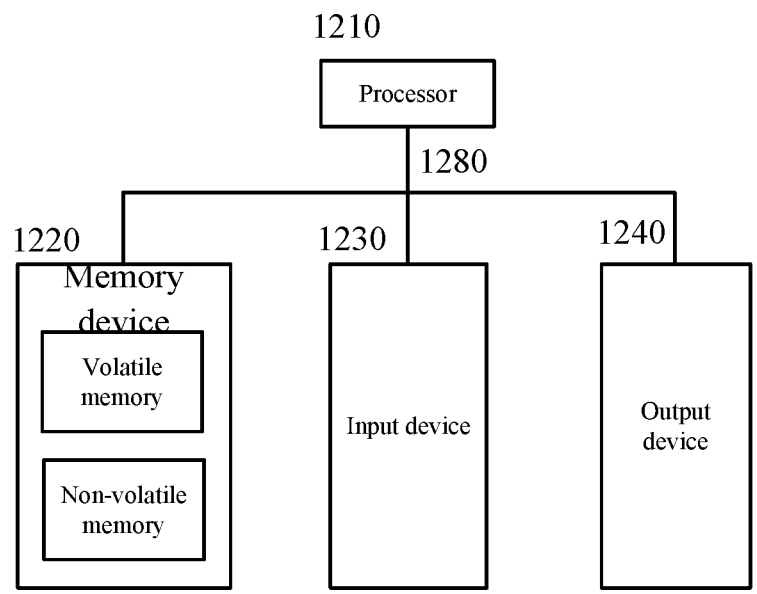
FIG. 12 is a schematic block diagram of an electronic device in which a facial feature adding and determining apparatus according to an embodiment of the present disclosure is implemented.

FIG. 12 shows a schematic block diagram of an electronic device in which a facial feature adding and determining apparatus according to an embodiment of the present disclosure is implemented.

The electronic device comprises one or more processors 1210, a memory device 1220, an input device 1230 and an output device 1240, and these components are interconnected via a bus system 1280 and/or other forms of connection mechanism (not shown). It should be noted that the components and structure of the electronic device shown in FIG. 12 are merely exemplary, rather than restrictive, the electronic device may also have other components and structures as desired.

The processor 1210 may be a central processing unit (CPU) or other forms of processing unit having data processing capability and/or instruction executing capability.

The storage device 1220 may include one or more computer program products, the computer program product may include various forms of computer readable storage medium, such as volatile memory and/or non-volatile memory. The volatile memory may include, for example, random access memory (RAM) and/or cache. The non-volatile memory may include, for example, read only memory (ROM), hard disk, flash memory. One or more computer program instructions may be stored on the computer-readable storage medium, and the processor 1210 can run the program instructions to implement the functions described above in the embodiments of the present disclosure (implemented by the processor) and/or other intended functions. Various applications and data, such as the given face image, the synthesized facial image, the demanded feature vector etc., as well as various data used and/or generated by the applications, may also be stored in the computer-readable storage medium.

The input device 1230 may include a device for inputting the given facial image or the feature to be added, such as a keyboard.

The output device 1240 may include a display to output the synthesized facial image and/or various score results, and may also include a speaker or the like to output various score results.

The computer program instructions stored in the storage device 1220 can be executed by the processor 1210 to implement the facial feature adding method and apparatus as described above, and the face feature adding and determining method and apparatus as described above, and to implement the facial feature image extraction network, the synthesized feature image generation network, the deep convolutional network for face determination in particular as described above.

As will be appreciated, according to an embodiment of the present disclosure, an image to be superimposed is generated by use of the synthesized feature image generation network and based on facial feature images and a demanded feature image(s), the image to be superimposed that includes the feature to be added can be generated fast without using the three-dimensional model, thereafter, a synthesized facial image that includes the feature to be added based on the given facial image can be obtained by superimposing the image to be superimposed and the given facial image.

In addition, according to an embodiment of the present disclosure, after the synthesized facial image is generated, by means of determining whether the generated synthesized facial image is a face and generating the corresponding first face satisfaction score, by use of a deep convolutional network for face determination, as well as calculating an L1 norm of the image to be superimposed, a linear combination of the face satisfaction score and the L1 norm can be used to construct loss functions of the facial feature image extraction network and the synthesized feature image generation network, thereby parameters of the facial feature image extraction network and the synthesized feature image generation network are updated.

In addition, according to an embodiment of the present disclosure, after the synthesized facial image is generated, by means of determining the second face satisfaction score of the real image with the feature to be added by use of the deep convolution network, a linear combination of the first face satisfaction score and the second face satisfaction can be used to construct a loss function of the deep convolution network for face determination, thereby parameters of the deep convolution network for face determination are updated.

With the above parameter updating, the facial feature image extraction network, the synthesized feature image generation network, and the deep convolution network for face determination can be trained in synchronization.

Although the exemplary embodiments of the present disclosure have been described with reference to the drawings, as will be appreciated, the above exemplary embodiments are only illustrative, not intended to limit the protection scope of the present disclosure. Those of ordinary skill in the art may make many changes, modifications, thereto without departing from the principle and spirit of the present disclosure, and all of these changes, modifications should fall into the protection scope of the present disclosure.

What is claimed is:

1. A facial feature adding method, comprising:
   generating an image to be superimposed based on a given facial image and a feature to be added on the given facial image; and
   superimposing the image to be superimposed and the given facial image to generate a synthesized facial image,
   wherein generating an image to be superimposed comprises:
   cutting out a partial image associated with the feature to be added from the given facial image based on the feature to be added on the given facial image;

extracting facial feature images by use of a facial feature image extraction network and based on the partial image that has been cut out; and generating the image to be superimposed by use of the synthesized feature image generation network and based on the facial feature images and a demanded feature image corresponding to the feature to be added, wherein a channel number of the partial image is the same as a channel number of the given facial image;

a size of the facial feature images is smaller than a size of the partial image, and a channel number of the facial feature images is larger than a channel number of the partial image; and a channel number of the image to be superimposed is the same as a channel number of the given facial image.

2. The facial feature adding method according to claim 1, wherein extracting facial feature images based on the partial image that has been cut out comprises:

performing linear transformation on the partial image that has been cut out to obtain an intermediate image with a first predetermined size, a channel number of the intermediate image being the same as a channel number of the partial image;

extracting facial feature images with a second predetermined size by use of the facial feature image extraction network and based on the intermediate image with the first predetermined size, the second predetermined size being smaller than the first predetermined size, and a channel number of the facial feature images being larger than a channel number of the intermediate image.

3. The facial feature adding method according to claim 2, wherein the facial feature image extraction network comprises P layers of convolutional neural network in concatenation, P being an integer larger than or equal to two, a first layer of convolutional neural network is used to receive the intermediate image with the first predetermined size, a P-th layer of convolutional neural network is used to output the facial feature images with the second predetermined size;

a size of output images of a p-th layer of convolutional neural network is smaller than a size of input images thereof, and a channel number of the output images of the p-th layer of convolutional neural network is larger than a channel number of the input images thereof, p being an integer larger than or equal to one and smaller than or equal to P.

4. The facial feature adding method according to claim 2, wherein generating the image to be superimposed based on the facial feature images and the demanded feature image comprises:

generating a synthesized feature image with a third predetermined size by use of the synthesized feature image generation network and based on the facial feature images and the demanded feature image, the third predetermined size being larger than the second predetermined size, and the third predetermined size being the same as or different than the first predetermined size;

performing inverse linear transformation corresponding to the linear transformation that has been performed after the cutting on the synthesized feature image with the third predetermined size to generate a partial image to be superimposed, a channel number of the partial image to be superimposed is the same as a channel number of the synthesized feature image, and a size of the partial image to be superimposed is the same as a size of the partial image that has been cut out, and any channel of the partial image to be superimposed uniquely corresponds to one channel of the given facial image.

5. The facial feature adding method according to claim 4, wherein the synthesized feature image generation network comprises at least one layer of fully connected neural network and K layers of integrated convolutional neural network in concatenation, K being an integer larger than or equal to two, the at least one layer of fully connected neural network is used to receive the facial feature images and the demanded feature image, a first layer of integrated convolutional neural network is used to receive output images of the at least one layer of fully connected neural network, a K-th layer of integrated convolutional neural network outputs the synthesized feature image with the third predetermined size, a size of output images of a k-th layer of integrated convolutional neural network is larger than a size of input images thereof, and a channel number of the output images of the k-th layer of integrated convolutional neural network is smaller than a channel number of the input images thereof, k being an integer larger than or equal to one and smaller than or equal to K.

6. The facial feature adding method according to claim 4, wherein the partial image to be superimposed serves as the image to be superimposed, superimposing the image to be superimposed and the given facial image to generate a synthesized facial image comprises: corresponding to the cutting performed on the given facial image, superimposing, pixel by pixel, corresponding channels of the image to be superimposed and the given facial image at a cutting position, or weighted-superimposing, pixel by pixel, corresponding channels of the image to be superimposed and the given facial image at a cutting position, so as to generate the synthesized facial image, a channel number of the synthesized facial image being the same as a channel number of the given facial image.

7. The facial feature adding method according to claim 4, wherein generating the image to be superimposed based on the facial feature images and the demanded feature image further comprises: corresponding to the cutting performed on the given facial image, performing image padding on the partial image to be superimposed so as to generate the image to be superimposed, a size of the image to be superimposed is the same as a size of the given facial image, a channel number of the image to be superimposed is the same as a channel number of the given facial image, and any channel of the image to be superimposed uniquely corresponds to one channel of the given facial image;

superimposing the image to be superimposed and the given facial image to generate a synthesized facial image comprises: superimposing, pixel by pixel, corresponding channels of the image to be superimposed and the given facial image, or weighted-superimposing, pixel by pixel, corresponding channels of the image to be superimposed and the given facial image, so as to generate the synthesized facial image, a channel number of the synthesized facial image being the same as a channel number of the given facial image.

8. The facial feature adding method according to claim 5, wherein the k-th layer of integrated convolutional neural network comprises: an amplification network and J layers of convolutional neural network, J being an integer larger than or equal to two;

in the case where k is equal to one, an amplification network of a first layer of integrated convolutional neural network is used to receive output images of the fully connected neural network; in the case where k is larger than one, an amplification network of a k-th layer of integrated convolutional neural network is used to receive output images of a (k−1)-th layer of integrated convolutional neural network;

a first layer of convolutional neural network of the k-th layer of integrated convolutional neural network receives output images of the amplification network, and a J-th layer of convolutional neural network of the k-th layer of integrated convolutional neural network is used to output the output images of the k-th layer of integrated convolutional neural network;

a size of the output images of a j-th layer of convolutional neural network is the same as a size of the input images thereof, and a channel number of the output images of the j-th layer of convolutional neural network is smaller than a channel number of the input images thereof, j being an integer larger than or equal to one and smaller than or equal to J.

9. The facial feature adding method according to claim 1, further comprising:
generating a first face satisfaction score by use of a deep convolutional network for face determination and based on the synthesized facial image;
calculating an L1 norm of the image to be superimposed; and
updating parameters of the facial feature image extraction network and the synthesized feature image generation network based on the first face satisfaction score and the L1 norm of the image to be superimposed.

10. The facial feature adding method according to claim 9, further comprising:
generating a second face satisfaction score by use of a deep convolutional network for face determination and based on a real image with the feature to be added; and
updating parameters of the deep convolutional network for face determination based on the first face satisfaction score and the second face satisfaction score.

11. The facial feature adding method according to claim 9, wherein the deep convolutional network for face determination comprises L layers of convolutional neural network and at least one layer of fully connected neural network;
a first layer of convolutional neural network is used to receive an input image, the at least one layer of fully connected neural network is used to receive output images of an L-th layer of convolutional neural network and output the face satisfaction score.

12. A facial feature adding apparatus, comprising:
a to-be-superimposed image generating module configured to generate an image to be superimposed based on a given facial image and a feature to be added on the given facial image; and
a synthesized facial image generating module configured to superimpose the image to be superimposed and the given facial image to generate a synthesized facial image,
wherein the to-be-superimposed image generating module comprises:
an image cutting module configured to cut out a partial image associated with the feature to be added from the given facial image based on the feature to be added on the given facial image;

a feature extracting module configured to extract facial feature images by use of a facial feature image extraction network and based on the partial image that has been cut out; and
a to-be-superimposed image synthesizing module configured to generate the image to be superimposed by use of the synthesized feature image generation network and based on the facial feature images and a demanded feature image corresponding to the feature to be added,
wherein a channel number of the partial image is the same as a channel number of the given facial image;
a size of the facial feature images is smaller than a size of the partial image, and a channel number of the facial feature images is larger than a channel number of the partial image; and
a channel number of the image to be superimposed is the same as a channel number of the given facial image.

13. The facial feature adding apparatus according to claim 12, further comprising:
a face determining module configured to generate a first face satisfaction score by use of a deep convolutional network for face determination and based on the synthesized facial image;
a norm calculating module configured to calculate an L1 norm of the image to be superimposed; and
a first parameter adjusting module configured to update parameters of the facial feature image extraction network and the synthesized feature image generation network based on the first face satisfaction score and the L1 norm of the image to be superimposed.

14. The facial feature adding apparatus according to claim 13, wherein the face determining module is further configured to generate a second face satisfaction score based on a real image with the feature to be added and by use of a deep convolutional network for face determination; and
the facial feature adding apparatus further comprises:
a second parameter adjusting module configured to update parameters of the deep convolutional network for face determination based on the first face satisfaction score and the second face satisfaction score.

15. A facial feature adding device, comprising:
one or more processors;
one or more memories in which program instructions are stored, the program instructions being executed by the one or more processors to execute the steps of
generating an image to be superimposed based on a given facial image and a feature to be added on the given facial image; and
superimposing the image to be superimposed and the given facial image to generate a synthesized facial image,
wherein generating an image to be superimposed comprises:
cutting out a partial image associated with the feature to be added from the given facial image based on the feature to be added on the given facial image;
extracting facial feature images by use of a facial feature image extraction network and based on the partial image that has been cut out; and
generating the image to be superimposed by use of the synthesized feature image generation network and based on the facial feature images and a demanded feature image corresponding to the feature to be added,
wherein a channel number of the partial image is the same as a channel number of the given facial image;

a size of the facial feature images is smaller than a size of the partial image, and a channel number of the facial feature images is larger than a channel number of the partial image; and a channel number of the image to be superimposed is the same as a channel number of the given facial image.

16. The facial feature adding device according to claim 15, wherein the one or more processors execute the program instructions further for:

generating a first face satisfaction score by use of a deep convolutional network for face determination and based on the synthesized facial image;

calculating an L1 norm of the image to be superimposed; and updating parameters of the facial feature image extraction network and the synthesized feature image generation network based on the first face satisfaction score and the L1 norm of the image to be superimposed.

17. The facial feature adding device according to claim 15, wherein the one or more processors execute the program instructions further for:

generating a second face satisfaction score based on a real image with the feature to be added and by use of a deep convolutional network for face determination; and updating parameters of the deep convolutional network for face determination based on the first face satisfaction score and the second face satisfaction score.

* * * * *